United States Patent
Sargent et al.

(10) Patent No.: US 11,894,206 B2
(45) Date of Patent: Feb. 6, 2024

(54) CONTROLLING AUTOMATIC OPERATION OF A TAILGATE RESPONSIVE TO AN APPLIED LOAD

(71) Applicant: Toyota Motor Engineering & Manufacturing North America, Inc., Plano, TX (US)

(72) Inventors: Corey B. Sargent, Novi, MI (US); Norman C. Kerr, Ann Arbor, MI (US); Justin B. Norris, Brighton, MI (US); Tarakorn Soonthornwinate, Plymouth, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 181 days.

(21) Appl. No.: 17/489,931

(22) Filed: Sep. 30, 2021

(65) Prior Publication Data
US 2023/0100832 A1 Mar. 30, 2023

(51) Int. Cl.
*B62D 33/027* (2006.01)
*H01H 35/00* (2006.01)

(52) U.S. Cl.
CPC ....... *H01H 35/006* (2013.01); *B62D 33/0273* (2013.01); *E05Y 2400/40* (2013.01); *E05Y 2400/445* (2013.01); *E05Y 2900/544* (2013.01)

(58) Field of Classification Search
CPC ................ B62D 33/03; B62D 33/0273; B62D 33/027; B60J 5/106; H01H 35/006; E05Y 2400/40; E05Y 2400/445; E05Y 2900/544
See application file for complete search history.

(56) References Cited

U.S. PATENT DOCUMENTS

| | | |
|---|---|---|
| 5,169,201 A | 12/1992 | Gower |
| 5,949,207 A | 9/1999 | Luebke et al. |
| 5,954,382 A | 9/1999 | Combs |
| 7,513,726 B1 | 4/2009 | Comiskey, Jr. |
| 8,033,052 B2 | 10/2011 | Kraus et al. |
| 8,061,761 B1 | 11/2011 | Sierra |
| 8,410,921 B1* | 4/2013 | Lewis ............ E05F 7/00 340/457 |
| 10,323,735 B2 | 6/2019 | Castelblanco et al. |
| 10,669,765 B2 | 6/2020 | Herrmann et al. |
| 2002/0135202 A1 | 9/2002 | Rokahr |
| 2003/0007851 A1* | 1/2003 | Heigl ............ A61G 3/061 414/454 |
| 2007/0035156 A1 | 2/2007 | Compton et al. |

(Continued)

FOREIGN PATENT DOCUMENTS

KR 20170081340 A 7/2017

*Primary Examiner* — Gregory A Blankenship
(74) *Attorney, Agent, or Firm* — Christopher G. Darrow; Darrow Mustafa PC (57) ABSTRACT

A vehicle tailgate assembly includes a tailgate and a switch assembly operably connected to the tailgate. The switch assembly includes a switch structured to be actuatable by application of a load exceeding a predetermined threshold to the tailgate. The switch assembly is operably connected to a tailgate automatic opening/closing mechanism such that actuation of the switch controls operation of the mechanism to prevent execution of a command to automatically open the tailgate when the tailgate is in a fully closed condition.

16 Claims, 9 Drawing Sheets

(56) References Cited

U.S. PATENT DOCUMENTS

| | | | | |
|---|---|---|---|---|
| 2014/0367992 A1* | 12/2014 | Brandscheid | ........ | B62D 35/008 |
| | | | | 296/180.1 |
| 2016/0160553 A1* | 6/2016 | Nania | .................... | E05F 15/627 |
| | | | | 296/50 |
| 2017/0269210 A1* | 9/2017 | Serban | .................... | G01S 17/04 |
| 2018/0266161 A1* | 9/2018 | Jergess | .................. | E05F 15/611 |
| 2018/0283058 A1* | 10/2018 | Orihara | .................. | H01H 3/141 |
| 2020/0141171 A1* | 5/2020 | Ghannam | ............... | E05F 15/73 |
| 2020/0362617 A1* | 11/2020 | Williams | .................. | G01L 5/00 |
| 2021/0006136 A1* | 1/2021 | Maruyama | ............. | H02K 11/28 |
| 2022/0065020 A1* | 3/2022 | Carter | .................... | G08C 17/02 |
| 2022/0297771 A1* | 9/2022 | Ozog | ....................... | H02P 27/08 |
| 2022/0316258 A1* | 10/2022 | Pulikonda | .......... | B62D 33/0273 |
| 2022/0316259 A1* | 10/2022 | Pulikonda | ............... | E05F 15/622 |
| 2022/0381067 A1* | 12/2022 | Noiri | ....................... | E05B 81/04 |
| 2023/0100832 A1* | 3/2023 | Sargent | ............. | B62D 33/0273 |
| | | | | 49/31 |
| 2023/0139499 A1* | 5/2023 | Wells | ................. | B62D 33/0273 |
| | | | | 296/183.1 |

* cited by examiner

CONTROLLING AUTOMATIC OPERATION OF A TAILGATE RESPONSIVE TO AN APPLIED LOAD

TECHNICAL FIELD

The subject matter described herein relates to control of automatic operation of vehicle rear doors and tailgates and, more particularly, to preventing execution of a command to automatically open of a vehicle tailgate responsive to detection of a load applied to the tailgate, to prevent damage to the tailgate and associated operating mechanism during opening.

BACKGROUND

During use of vehicles (such as pickup trucks) with cargo beds and tailgates, certain types of cargo may overhang the tailgate, resulting in the application of a load to a rear edge of the tailgate when the tailgate is closed. If the applied load is above a predetermined threshold value, automatically opening of the tailgate under load may cause the operating parameters of the tailgate opening/closing mechanism to be exceeded. This may result in opening of the tailgate at an excessive speed and/or damage to the tailgate or the tailgate opening/closing mechanism. This may be especially problematic when the tailgate control system receives a command to automatically open the tailgate in a situation where a human user is not in a position to ascertain that the tailgate may be overloaded. Thus, it is desirable to prevent execution of an automatic tailgate opening command in situations where the tailgate is in a fully closed condition and excessively loaded.

SUMMARY

In one aspect of the embodiments described herein, a vehicle tailgate assembly is provided. The tailgate assembly includes a tailgate and a switch assembly operably connected to the tailgate. The switch assembly includes a switch structured to be actuatable by application of a load exceeding a predetermined threshold value to the tailgate. The switch assembly is operably connected to a tailgate automatic opening/closing mechanism such that actuation of the switch controls operation of the mechanism to prevent execution of a command to automatically open the tailgate when the tailgate is in a fully closed condition.

In another aspect of the embodiments described herein, a method of controlling operation of a tailgate of a vehicle is provided. The method includes a step of controlling operation of the vehicle so as to prevent execution of a command to automatically open the tailgate when the tailgate is in a fully closed condition, responsive to application of a load exceeding a predetermined threshold value to a rear portion of the tailgate.

In yet another aspect of the embodiments described herein, a system for controlling operation of a tailgate assembly of a vehicle is provided. The system includes a switch structured to be actuatable by application of a load exceeding a predetermined threshold value to the tailgate assembly. The system also includes a processor and a memory communicably coupled to the processor and storing a tailgate control module including computer-readable instructions that when executed by the processor cause the processor to control operation of the vehicle to prevent execution of a command to automatically open the tailgate when the tailgate is in a fully closed condition and while the switch is in an actuated condition.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Embodiments described herein relate to a vehicle tailgate assembly designed to prevent automatic opening of a vehicle tailgate if the tailgate is in a fully closed condition and a cargo load above a predetermined threshold value is acting on the tailgate. A switch is mounted along the rear edge of the tailgate and is structured to be actuatable by application of a load exceeding the predetermined threshold value to the tailgate. The switch is operably connected to a tailgate automatic opening/closing mechanism such that actuation of the switch controls operation of the mechanism to prevent execution of a command to automatically open the tailgate. The cargo load may be applied to the switch through a spring-loaded load distributor which bears against a garnish covering the rear edge of the tailgate. The load distributor acts to distribute the applied cargo load and to return the garnish to a normal, unloaded configuration after removal of the cargo load. The tailgate assembly and other, connected elements may operate to prevent execution of a command to automatically open the tailgate as long as the switch remains actuated.

In the drawings referenced herein, similar reference characters may refer to similar features shown in different views.

Figure 1:
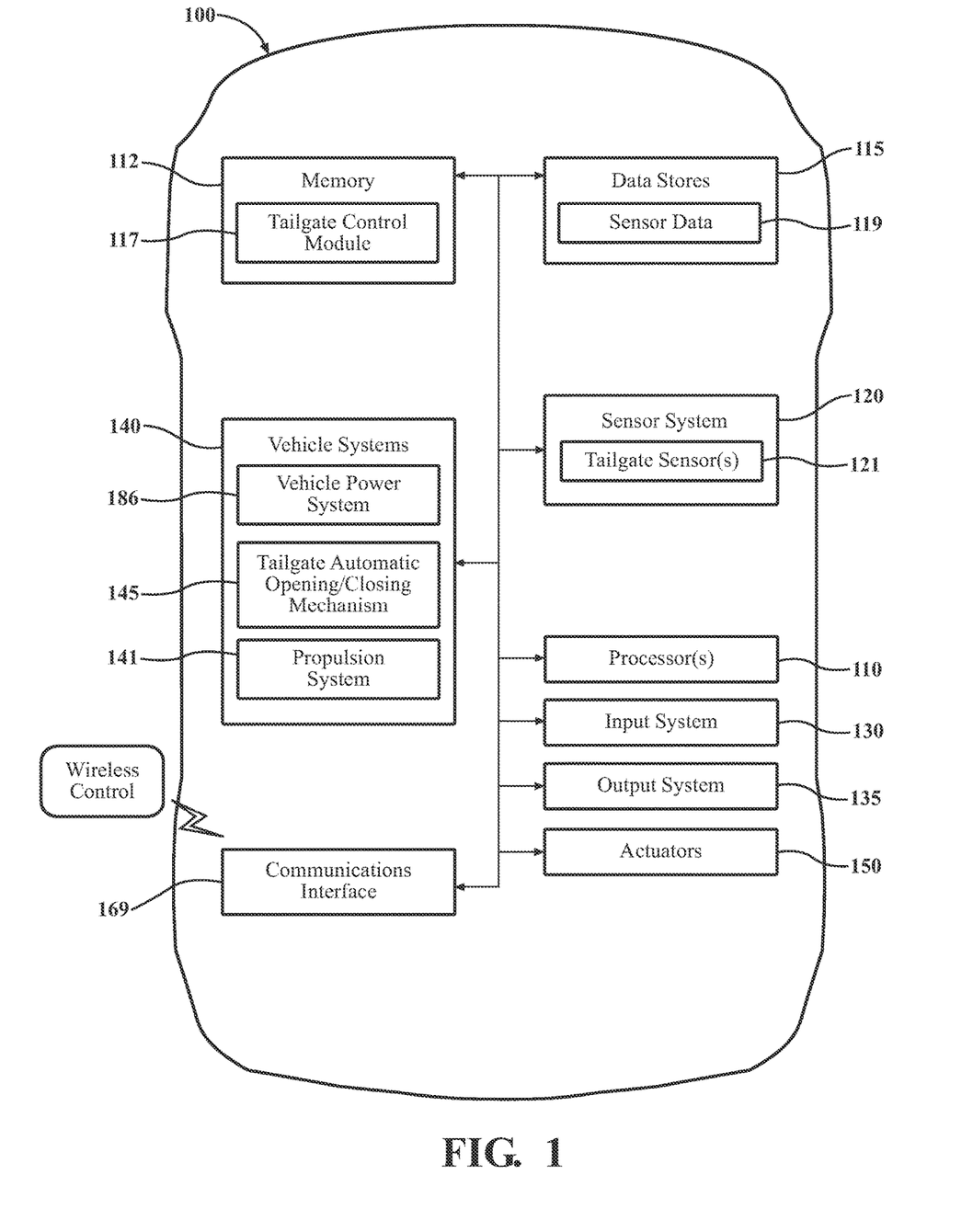
FIG. 1 is a schematic view of an example of a vehicle incorporating a system for controlling automatic operation of a vehicle tailgate assembly responsive to application of a load to the tailgate, in accordance with embodiments described herein.

FIG. 1 is a schematic view of an example of a vehicle 100 incorporating a system for controlling automatic operation of a vehicle tailgate assembly responsive to application of a load to the tailgate, in accordance with embodiments described herein. As used herein, a "vehicle" is any form of motorized transport. In one or more implementations, the vehicle 100 is conventionally-powered or hybrid passenger vehicle. While arrangements will be described herein with respect to passenger vehicles, it will be understood that embodiments are not limited to passenger vehicles. In some implementations, the vehicle 100 may be any form of motorized transport that benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100.

Some of the possible elements of the vehicle 100 are shown in FIG. 1 and will be described with reference thereto. Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

The vehicle 100 can include one or more processor(s) 110. In one or more arrangements, the processor(s) 110 can be a main processor(s) of the vehicle 100. For instance, the processor(s) 110 can be an electronic control unit (ECU). The vehicle 100 can include one or more data stores 115 for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operably connected to the processor(s) 110 for use thereby. The term "operably connected," as used throughout this description, can include direct or indirect connections, including connections without direct physical contact.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more tailgate sensors 109 of the sensor system 120.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor(s) to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1) for storage and processing of sensor data.

Sensor system 120 may include sensors configured to detect the current state or status of vehicle systems and components. The sensor system 120 can include any suitable type of sensor. One or more examples of different types of sensors will be described herein. However, it will be understood that the embodiments are not limited to the particular sensors described or to the particular sensors shown in FIG. 1. The sensor system 120 may include any sensors suitable for and/or required to perform any of the data acquisition and/or vehicle control operations contemplated herein.

The sensor system 120 can include one or more tailgate sensors 121. The tailgate sensor(s) may be configured to detect and/or determine information about the tailgate, such as whether the tailgate is open or closed, a position or angular orientation of the tailgate if the tailgate is partially open, and other aspects relating to tailgate control operations. The tailgate 206 may be considered "fully-closed" or "fully-raised" either when the tailgate is moved as far as possible in the closing direction of the tailgate before further such movement is blocked by cargo bed sidewalls 208 or some other vehicle feature, or when the tailgate 206 is in a closed or upright/vertical orientation which permits locking or latching of the tailgate. The tailgate 206 may or may not be latched when in the fully closed position. The tailgate 206 may be considered "fully open" or "fully lowered" when the tailgate is moved as far as possible in the opening direction of the tailgate before further such movement is blocked by a vehicle feature (such as a support cable or a shoulder) designed to limit the opening motion of the tailgate.

The vehicle wireless communications interface 169 may be configured to enable and/or facilitate communication between the components and systems of the vehicle and entities (such as cloud facilities, cellular and other mobile communications devices, other vehicles, etc.) exterior of the vehicle. For example, an alert caused by actuation of a switch as described herein may be transmitted to user mobile or control device via the wireless communications interface 169. Alternatively, an audible alert may be generated responsive to actuation of a switch, for broadcast through an internal and/or external vehicle speaker system (not shown) of the vehicle. Such alerts may indicate to a user that a load-detecting tailgate switch of the tailgate assembly 204, 1204, 2204 has been actuated, thereby indicating that a cargo load above a predetermined threshold value is being applied to the tailgate assembly.

The vehicle 100 can include an input system 130. An "input system" includes any device, component, system, element or arrangement or groups thereof that enable information/data to be entered into a machine. For example, the input system 130 may include a keypad, a touch screen or other interactive display, a voice-recognition system and/or any other device or system which facilitates communications between a user and the vehicle. The input system 130 can receive an input from a vehicle occupant (e.g., a driver or a passenger) or a user located remotely from the vehicle 100. In particular embodiments, the input system 130 may include buttons and/or switches enabling a user to implement an automatic opening and/or closing operation of the tailgate 206 simply by actuating the buttons/switches. The vehicle 100 can also include an output system 135. An "output system" includes any device, component, or arrangement or groups thereof that enable information/data to be presented to a vehicle occupant (e.g., a driver, a vehicle passenger, etc.) or a remote user.

The vehicle 100 can include one or more vehicle systems, collectively designated 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle systems 140 can include a propulsion system 141 and a vehicle power system 186. Each of these systems can include one or more devices, components, and/or a combination thereof, now known or later developed.

The propulsion system 141 may include an engine (not shown) of the vehicle 100. The engine may be an internal combustion engine in a conventionally-powered vehicle, an internal combustion engine or an electric motor in a Hybrid electric-petroleum vehicle, or an electric motor in a fully electrically-powered vehicle, for example. The engine may be configured to generate power for propelling the vehicle and for powering vehicle systems and components. The engine may be turned on in a conventional manner by activation of an ignition switch. In one or more arrangements, the ignition switch may be configured to be activatable by a human driver or vehicle occupant. In one or more arrangements, power generated by the vehicle engine may be stored, controlled, converted and/or distributed to the systems and components of the vehicle.

The vehicle power system 186 may include the a vehicle battery, one or more generators, and any circuitry and/or other elements needed to generate, store, control, convert and/or distribute power to the systems and components of the vehicle, including the tailgate automatic opening/closing mechanism 145. In one or more arrangements, the vehicle engine may also form a portion of the power system 186. Power distribution to the tailgate automatic opening/closing mechanism 145 may be configured to be interruptible and/or preventable responsive to actuation of the various tailgate assembly switches as described herein.

The tailgate automatic opening/closing mechanism 145 may be any mechanism, either existing or later-developed, configured to control automatic opening and closing operations of the tailgate 206. The mechanism 145 may incorporate any of a variety of motion control and supporting elements, for example, spindles, pulleys, gears, cylinders, motors, etc. Automatic opening and closing of the tailgate 206 by the mechanism 145 may be controllable from inside the vehicle (for example, using a manually operable console button or control) or remotely (using a key fob, for example). Operation of the tailgate automatic opening/closing mechanism 145 may cause the tailgate 206 to open or close automatically using vehicle power, without the need for a user to manually lift or lower the tailgate.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or any vehicle module(s). Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by processor(s) 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more of data store(s) 115 may contain such instructions.

Generally, a module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include a tailgate control module 117. In one or more arrangements, control of the tailgate assembly (including control of operations responsive to actuation of one or more switches as described herein) may be performed by the tailgate control module 117. The tailgate control module 117 may be configured to control any of a variety of operations of the tailgate automatic opening/closing mechanism 145. In one or more particular arrangements, the tailgate control module may be configured to control distribution of power from a power source to the tailgate automatic opening/closing mechanism responsive to actuation of any of the tailgate switches 214 as described herein. The tailgate control module 117 may be configured to control operation of the vehicle 100 to interrupt or prevent a flow of electric current to the tailgate automatic opening/closing mechanism 145 as long as any of the tailgate switches 214 are in an actuated condition due to application of a cargo load. Alternatively, power distribution to the tailgate automatic opening/closing mechanism 145 may be controlled by a suitable hard-wiring or circuit arrangement designed to interrupt or prevent power to the mechanism as long as any of the switches 214 are in an actuated condition. Thus, power distribution to the mechanism 145 may be controlled directly by actuation of the switches 145 without the need for a tailgate control module 117. The processor(s) 110 and the tailgate control module 117 can be operably connected to communicate with the other systems and elements of the vehicle 100 to perform the control functions described herein.

Figure 2:
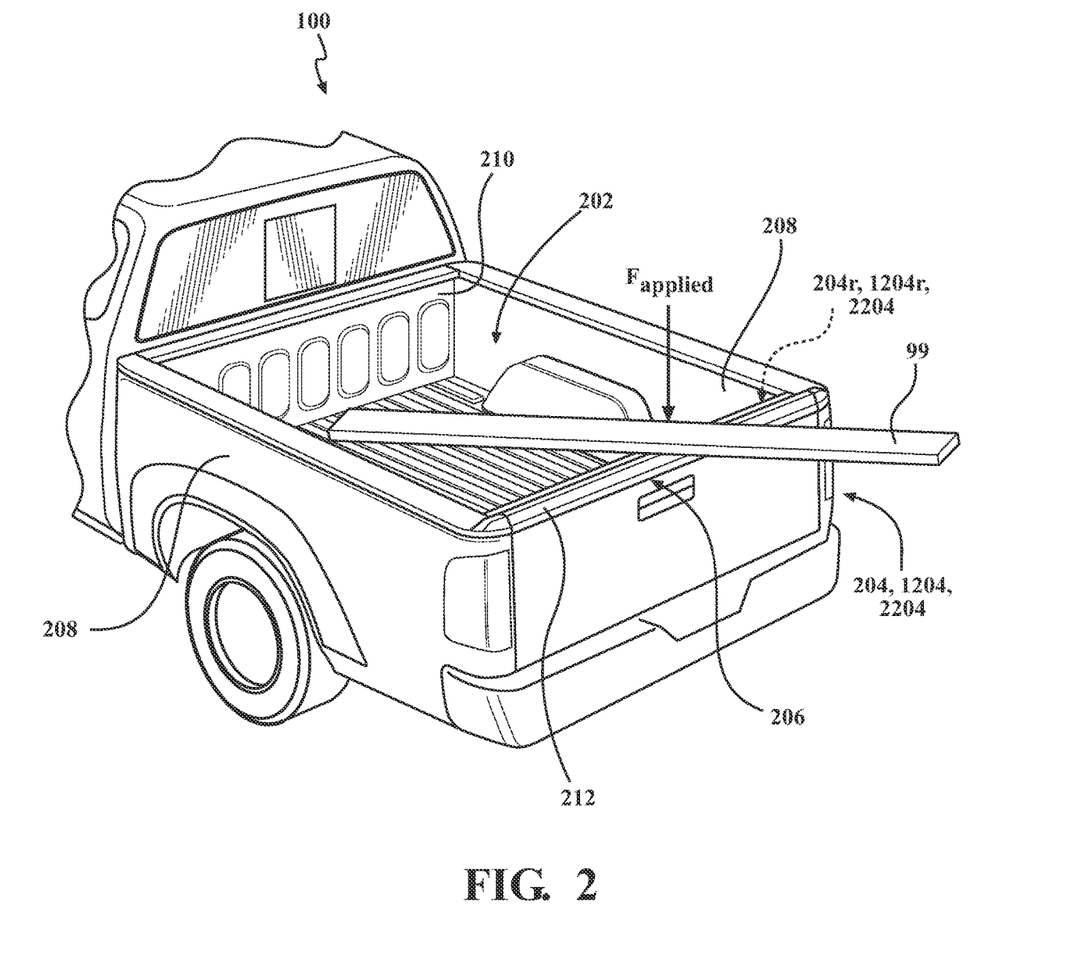
FIG. 2 is a rear perspective view of a vehicle as shown schematically in FIG. 1, showing an exemplary situation in which a load may be applied to the tailgate when the tailgate is in a fully closed condition.

FIG. 2 is a rear perspective view of the vehicle 100 shown schematically in FIG. 1, showing an exemplary situation in which a load $F_{applied}$ may be applied to the tailgate when the tailgate is in a fully closed condition. The vehicle 100 may include a cargo bed 202 and an embodiment 204, 1204, 2204 of a tailgate assembly incorporating a tailgate 206, with a cargo load 99 (e.g., lumber) overhanging the tailgate rear edge and extending outside the bed 202. The cargo exerts a load $F_{applied}$ on a rear portion of the tailgate assembly when the tailgate 206 is closed. The cargo bed 202 may be defined by sidewalls 208, a front wall 210, and the openable rear tailgate 206. In the embodiment shown, the vehicle 100 is in the form of a pickup truck. However, embodiments of the invention described herein may be incorporated into other types of vehicles having a cargo bed or storage area partially defined by an openable rear door or gate. The embodiment shown in FIGS. 3A-4B includes a tailgate assembly 204, the embodiment shown in FIGS. 5A-6B includes a tailgate assembly 1204, and the embodiment shown in FIGS. 7A-7B includes a tailgate assembly 2204.

Referring to FIGS. 3A-4B, the tailgate assembly 204 may include a tailgate assembly rear portion 204r. The tailgate assembly rear portion 204r may include a rear portion 206r of the tailgate 206 and other elements described herein which are positioned to form a rear-most portion of the vehicle 100 when the tailgate 206 is in a "down" or fully-lowered position.

The tailgate 206 may have a rear edge 206r. A garnish or covering 212 may be applied to cover the tailgate rear edge 206r, to improve the appearance of the tailgate 206 and to help protect the rear edge 206r from damage. The garnish 212 may be formed from any suitable material. In one or more arrangements, the garnish 212 is formed from a flexible polymeric material having a relatively high UV resistance and acceptable low temperature impact performance, such as polypropylene. When a cargo load $F_{applied}$ is applied to the tailgate assembly rear portion 204r as shown in FIGS. 2, 4A-4B, and 6A-6B the load may be applied through the garnish 212.

The garnish 212 may be in an unloaded configuration (as shown in FIGS. 3A-3B and 5A-5B) when no load is applied to the tailgate 206 along the rear edge 206r. The garnish 212 may be in a loaded configuration (shown in FIGS. 4A-4B and 6A-6B) when a load acting on the rear edge 206r is applied to the tailgate 206. The garnish 212 may temporarily deform responsive to application of a load along the tailgate rear edge 206r as described herein, and may be structured to be deformable responsive to application of the load.

Referring to FIGS. 3A-3B and 5A-5B, to prevent execution of a command to automatically open the tailgate 206 in situations where the tailgate assembly 204 is loaded above a predetermined threshold value, a switch assembly 214 may be incorporated into the tailgate assembly. The switch assembly 214 may be operably connected to the tailgate automatic opening/closing mechanism 145 for controlling certain aspects of automatic tailgate opening and closing operations.

In one or more arrangements, the switch assembly 214 may be operably connected to the tailgate automatic opening/closing mechanism 145 so that actuation of a switch of the switch assembly 214 effectively prevents opening of the tailgate 206 responsive to a command to automatically open the tailgate 206 when it is in a fully closed condition. In one or more arrangements, a switch of the switch assembly 214 may be structured to be actuatable by movement of at least a portion of a load distributor 224 (described in greater detail below) a predetermined distance in a direction D4 toward the rear edge. Thus, when the switch is actuated by application of a cargo load above a predetermined threshold value to the tailgate assembly as described herein, automatic opening of the tailgate may be prevented until the applied cargo load is removed or reduced to below the predetermined threshold value.

A switch used by an embodiment described herein may be any type of switch, as long as at least a portion of an applied cargo load can be transmitted to the switch by movement of the load distributor 224 to actuate the switch. A switch or switch assembly described herein is considered to be "actuated" or in an "actuated condition" when contacts of the switch are closed or in actual physical contact, or when a circuit in the switch is otherwise closed so as to operate a control circuit routed through the switch or operably connected to the switch in a manner that prevents execution of a command to automatically open the tailgate.

Referring to FIGS. 3A-6B, in particular arrangements, a switch of the switch assembly 214 may be a ribbon switch 214r. Operation of such a switch is shown in FIG. 4C. Such switches are known and are readily available from a variety of sources (for example, Tapeswitch Corp. of Farmingdale, New York). Generally, the switch 214r may rest on a flat surface. In the embodiments shown in the drawings, the ribbon switch 214r rests on the tailgate rear edge 206r. Electrical contacts CC1, CC2 of the switch 214r may be separated prior to application of a load to the switch. As shown in FIG. 4C, when a force f1 above a predetermined threshold value is applied to a deflectable upper portion of the switch, the electrical contacts CC1 and CC2 meet, thereby completing a circuit and actuating the switch.

Referring to FIGS. 3A-6B, in embodiments where a ribbon switch 214r is used, the switch assembly 214 may include a bearing member 214b attached to the switch. The bearing member 214b may be structured for contact with at least a portion of the load distributor 224 and may enable at least a portion of an applied cargo load to be transmitted from the load distributor 224 to the switch 214r without direct physical contact between the load distributor 224 and the switch. The use of the bearing member 214b to bridge the space between the load distributor 224 and the switch 214r may enable more flexible positioning of the switch. The bearing member 214b may have any suitable configuration and may be formed from any suitable material.

In particular arrangements (and as shown in FIGS. 3A-6B), the bearing member 214b may extend along substantially the entire length of the ribbon switch 214r to enable efficient transmission of the cargo load from the load distributor 224 to the switch 214r for any point of application of the cargo load. In one or more arrangements, the bearing member 214b may be spaced a predetermined distance d1 apart from the load distributor 224 when the garnish is in the unloaded configuration. In particular arrangements, the spacing d1 may be 1 millimeter.

Figure 7A:
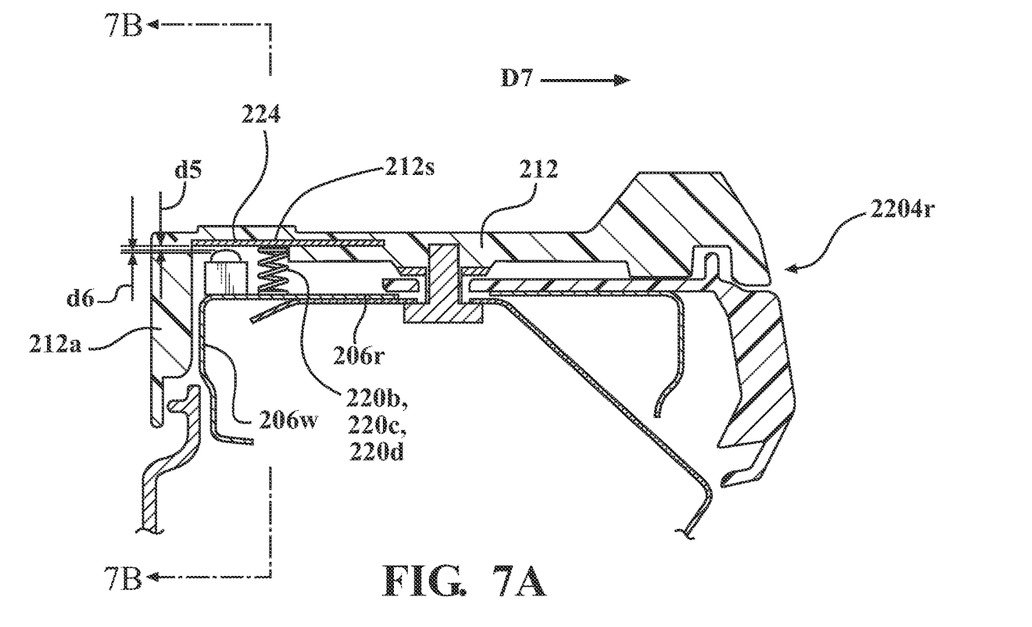
FIG. 7A is a cross-sectional side view of a portion of yet another embodiment of the tailgate assembly, shown prior to application of a cargo load to the tailgate assembly and prior to actuation of one or more button switches of the embodiment.
Figure 7B:
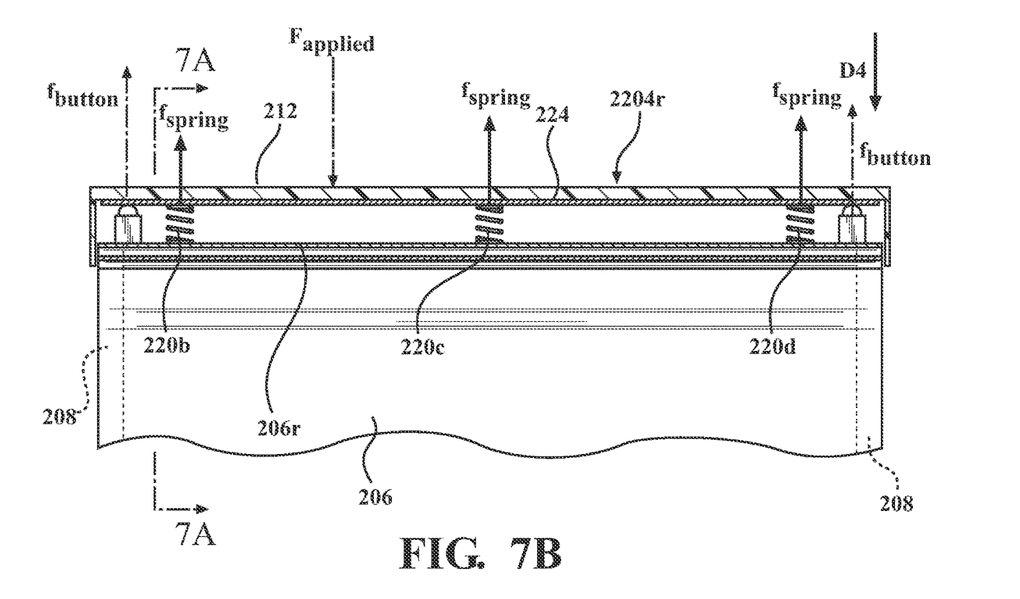
FIG. 7B is a cross-sectional end view of a portion of the tailgate assembly shown in FIG. 7A showing actuation of the button switch(es) by application of a cargo load to the rear portion of the tailgate assembly.

Referring to FIGS. 7A and 7B, in other arrangements, a switch of the switch assembly 214 may be a momentary switch or button switch 214m. Such switches are known and are readily available from a variety of sources (for example, McMaster-Carr of Aurora, OH). In particular arrangements, the switch assembly 214 includes a plurality of momentary switches 214m positioned spaced apart along the tailgate rear edge 206r. In one or more arrangements, each switch 214m may be spaced a predetermined distance d5 apart from the load distributor 224 when the garnish 212 is in the unloaded configuration. In particular arrangements, the spacing d5 may be 1 millimeter.

Referring to FIGS. 3A-7B, application of a cargo load $F_{applied}$ to the garnish 212 may produce a localized deformation of the garnish. The garnish 212 may remain deformed while in the loaded configuration. It is desirable for the garnish 212 to return to its unloaded (i.e., normal) configuration and appearance after removal of the applied load $F_{applied}$ from along the tailgate assembly rear portion 204r. It has been found that application of a restoring force may be necessary to return the garnish 212 to its unloaded or undeformed configuration after removal of the applied load. To this end, one or more springs 220 may be positioned between the garnish 212 and the tailgate rear edge 206r. The springs 220 may be structured to exert restoring forces on the garnish 212, to return the garnish to its unloaded configuration after removal of the cargo load. Spring(s) 220 may be coil spring(s), leaf spring(s), or any other type of spring suitable for performing the spring functions described herein. FIGS. 3A-4B illustrate an embodiment which uses a single spring 220a to apply the restoring force to the garnish. FIGS. 5A-7B illustrate embodiments which use three spaced-apart springs (220b, 220c, 220d) to apply the restoring force to the garnish.

Referring again to FIGS. 3A-7B, in one or more arrangements, to aid in returning the garnish 212 to its unloaded configuration after removal of the cargo load, a load distributor 224 may be movably mounted to the tailgate 206 opposite the tailgate rear edge 206r (i.e., the load distributor 224 may be mounted to the tailgate 206 so as to be movable with respect to the tailgate). The load distributor 224 may extend along substantially the entire length of the tailgate rear edge 206r. The load distributor 224 may be designed so as to maximize stiffness of the part over its length, while also minimizing total part weight.

The tailgate assembly 204 may be structured so that at least a portion of the garnish 212 is always in direct physical contact with the load distributor 224. The load distributor 224 may be covered by the garnish 212 so that a load transmitted to the load distributor 224 is applied to an exterior of the garnish 212 and operates through the garnish. In one or more arrangements, the load distributor 224 may be a flat plate structured as shown in the drawings.

Referring to the drawings, the load distributor 224 may be structured and mounted to contact a part 212a of the garnish 212 extending along an upper portion of the tailgate interior wall 206w. The load distributor 224 may extend rearwardly (in direction D7) a specified distance from the garnish portion 212a to support a portion of a cargo load applied to the tailgate assembly rear portion 204r as shown in the drawings.

The load distributor 224 may be formed from any suitable material or materials. In particular arrangements, the load distributor 224 is formed from an aluminum alloy. The load distributor 224 may be mounted to the tailgate 206 so as to be movable in a direction D4 toward the tailgate rear edge 206r. When in contact with the spring(s) 220, the load distributor 224 may aid in efficiently distributing the spring restoring forces along the length of the garnish 212 so that a localized deformation anywhere along the length of the garnish may be overcome.

To help urge the garnish 212 from a loaded configuration to its unloaded configuration after a cargo load applied to the garnish has been removed, spring(s) 220 may be structured and mounted on the tailgate 206 so as to bias the load distributor against an inner surface 212s of the garnish when no cargo load is applied to the garnish 212. As shown in the drawings, spring(s) 220 may be positioned between the load distributor 224 and the tailgate rear edge 206r. The spring(s) 220 may be structured to exert forces on the load distributor 224 in a direction away from the tailgate rear edge 206r. In cases where a single spring is used, the spring may be structured to exert a force on the load distributor 224 sufficient to reconfigure any portion of the garnish 212 in contact with the load distributor 224 from the loaded configuration to the unloaded configuration, when the cargo load is removed. The spring(s) 220 may have the same properties, or the properties of different springs may be different from each other.

Referring to FIGS. 5A-7B, in particular arrangements, a plurality of springs 220b, 220c, 220d may be distributed along the tailgate rear edge 206r to contact the load distributor 224 at several spaced-apart locations. In cases where a plurality of springs is used, the plurality of springs may be structured to, in combination, exert forces on the load distributor 224 sufficient to reconfigure any portion of the garnish 212 in contact with the load distributor from the loaded configuration to the unloaded configuration. Springs 220b, 220c, 220d of the plurality of springs may be evenly distributed along the tailgate rear edge 206r, or the spacings between pairs of adjacent springs may be varied as needed to provide a desired force distribution.

In particular arrangements, the tailgate assembly 204 may be structured so that the spring(s) 200 are always pre-deflected an initial amount $d_{initial}$ when the tailgate assembly 204 is unloaded and the load distributor 224 is biased against the inner surface 212s of the garnish 212. In particular arrangements, the spring(s) 200 may be structured and arranged along the length of the load distributor 224 so as to ensure that the spring(s) (in combination) exert a sufficient force, when each spring is compressed to the initial deflection $d_{initial}$ and when the spring forces are transmitted through the load distributor 224, to return the garnish 212 from a loaded configuration to its unloaded configuration after the load has been removed. This pre-deflection of the spring(s) 220 and the use of the load distributor 224 ensure that the garnish 212 will always be in the unloaded or normal configuration when a cargo load is not applied. Spring properties which provide the effects described herein may be determined for a given spring spatial arrangement, type of spring(s) and/or garnish structure by analysis and/or iteratively by experimentation.

Thus, for example, if it is determined that a force contribution of at least 5 lbs. is required from each spring acting through the load distributor 224 to restore the garnish 212 after deformation under the predetermined threshold load, and if the initial spring deflection is specified at 1 mm, the spring constant of each spring may be specified such that each spring exerts a force of 5 lbs. when the spring is compressed by 1 mm. This ensures that the spring force will always be sufficient to return the garnish 212 to its loaded configuration after unloading, because a force greater than the garnish restoring force (i.e., 5 lbs. in the example) will be exerted by the spring 220 when it further compressed to actuate the switch. This arrangement also ensures that the load distributor 224 will always be biased against the garnish interior surface 212s.

Referring to FIGS. 3A-6B, in one or more arrangements incorporating a ribbon switch 214r, the load distributor 224 may be spaced apart a distance d1 from the bearing member 214b when the garnish 212 is in the unloaded configuration. In addition, as shown with particular reference to FIGS. 3A, 4C, and 5A, the bearing member 214b may need to move a predetermined distance d2 after being contacted by the load distributor 224 in order to actuate the switch 214r. Thus, the spring(s) 220 may undergo a total additional deflection (i.e., in addition to the initial deflection $d_{initial}$) of d1+d2 before the switch 214r is actuated.

Generally, if the springs 220 have the same properties, an applied load needed to actuate the switch 214r must exceed the sum of the forces generated by the spring(s) 220 and the switch actuation force:

$$F_{applied} > (f_{spring} \times N) + f_{switch}$$

where:
$F_{applied}$=the applied cargo load;
$f_{spring}$=the force generated by each spring 220 when compressed by an amount ($d_{initial}$+d1+d2) (in a case where all the springs having the same properties);
N=the number of springs 220;
$f_{switch}$=the switch actuation force; and
d1 is a spacing between the load distributor 224 and the bearing member 214b when the garnish 212 is in the unloaded configuration.

The applied load $F_{applied}$ may be a minimum predetermined threshold load at which it is desired to actuate the ribbon switch 214r to prevent automatic opening of the tailgate 206. In one or more particular arrangements, the threshold load may be 100 lbs. Thus, using this as a design criterion, the switch 214r may be designed to actuate responsive to an applied load of 100 lbs.

FIGS. 3A-4B illustrate an embodiment which uses a single spring (i.e., N=1) to apply the restoring force to the garnish. FIGS. 5A-7B illustrate embodiments which use three spaced-apart springs (N=3) to apply the restoring force to the garnish. Given the above, the design criterion for the ribbon switch actuation force $f_{switch}$ may become:

$$F_{applied} - (f_{spring} \times N) > f_{switch}$$

Thus, the ribbon switch actuation force $f_{switch}$ may be set to some value slightly below the difference between the applied load and the combined spring forces. This ensures that the applied load $F_{applied}$ will be slightly greater than the switch actuation force so that an applied load of the specified magnitude always actuates the switch.

In one example, for the arrangement shown in FIGS. 5A-6B, if it is desired to actuate the switch at an applied load of 100 lbs., and the total deflection of each of the springs 220 by an amount $d_{initial}$+d1+d2 produces a load of 5 lbs. in each spring, the switch actuation force may be specified at:

$$100 \text{ lbs.} - (3 \times 5 \text{ lbs.}) > f_{switch}$$

$$85 \text{ lbs.} > f_{switch}$$

Thus, the load acting on the ribbon switch 214r will be 85 lbs. in excess of the combined spring forces acting on the load distributor 224 and, for the configuration shown in the example, the switch actuation force $f_{switch}$ may be set at slightly less than 85 lbs. for the switch to actuate at an applied cargo load $F_{applied}$ of 100 lbs.

Alternatively, the number, characteristics, and/or spatial arrangement of the springs 220 may be adjusted to help achieve a desired value of the switch actuation force.

FIGS. 3A-4B illustrate an arrangement of the tailgate assembly utilizing a single garnish restoring spring 220a acting on the load distributor 224 at the midpoint between the ends of the load distributor. The embodiment of FIGS. 3A-4B also uses a ribbon switch 214r to control operation of the tailgate automatic opening/closing mechanism 145.

Figure 3A:
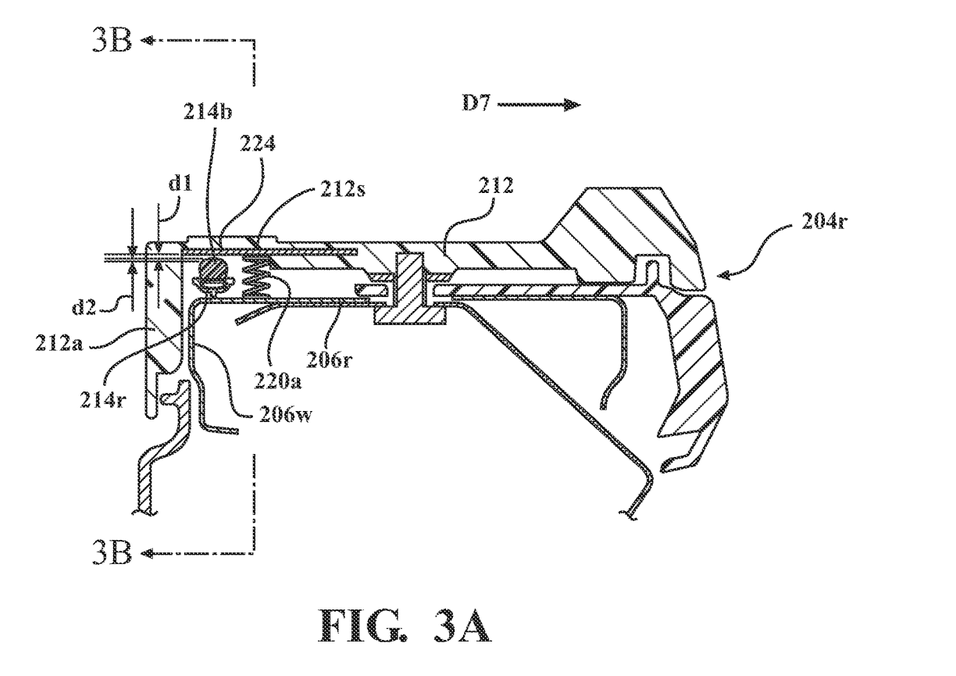
FIG. 3A is a cross-sectional side view of a portion of an embodiment of the tailgate assembly, shown prior to application of a cargo load to the tailgate assembly and prior to actuation of a ribbon switch of the embodiment.
Figure 3B:
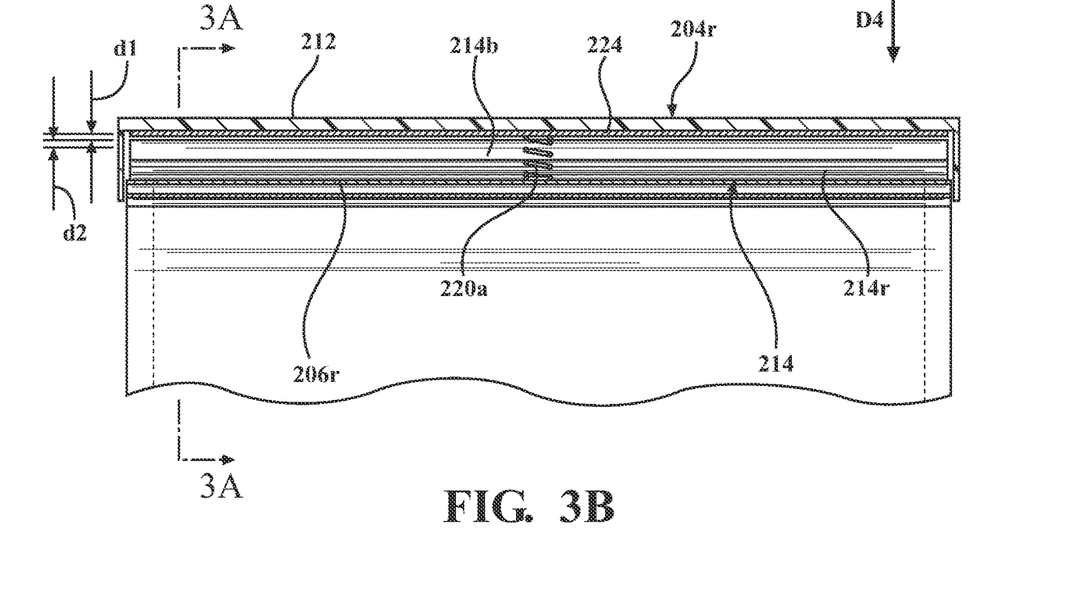
FIG. 3B is a cross-sectional end view of a portion of the tailgate assembly shown in FIG. 3A.
Figure 4A:
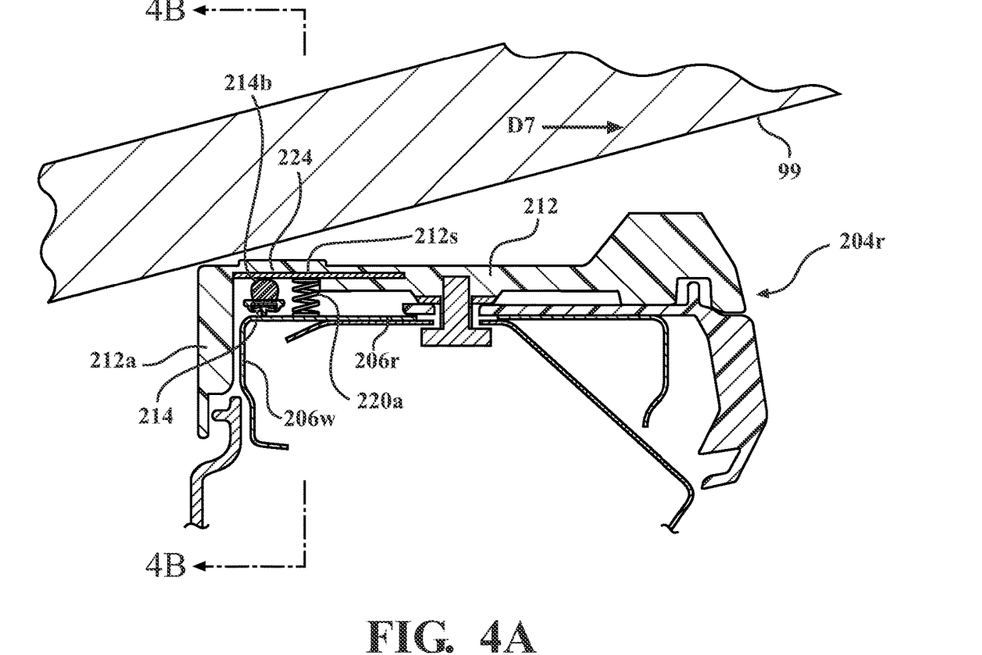
FIG. 4A is the cross-sectional side view of FIG. 3A showing actuation of the ribbon switch by application of a cargo load to the rear portion of the tailgate assembly.
Figure 4B:
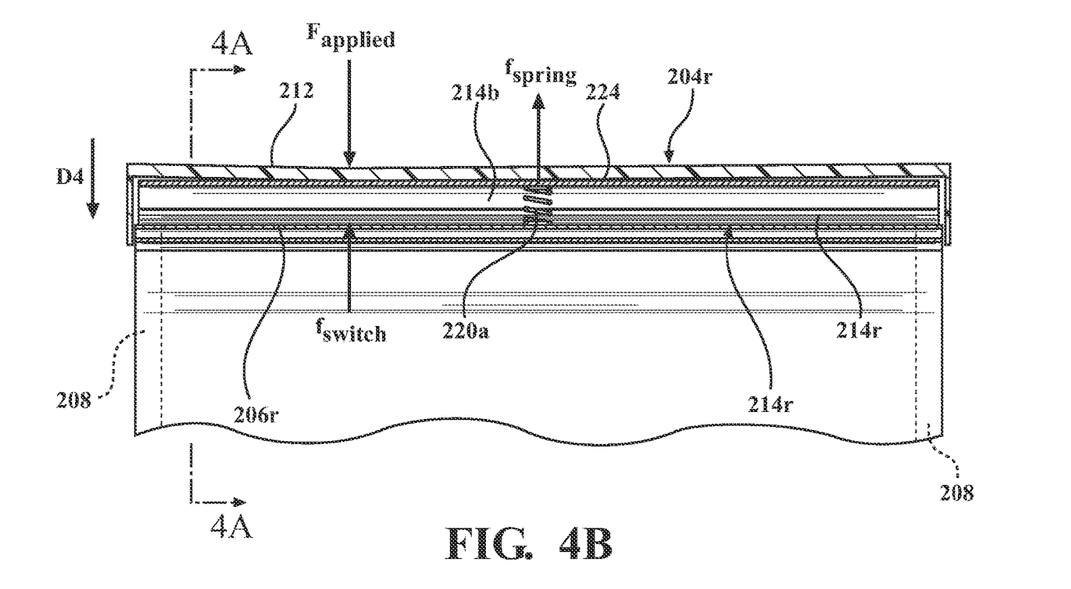
FIG. 4B is a cross-sectional end view of a portion of the tailgate assembly shown in FIG. 3A.

FIG. 3A is a cross-sectional side view of a portion of an embodiment 204 of the tailgate assembly. FIG. 3B is a cross-sectional end view of the tailgate assembly shown in FIG. 3A. FIGS. 3A-3B show the tailgate assembly 204 with no cargo load applied and with the garnish 212 in the unloaded configuration. Prior to application of the load, the load distributor 224 may be spaced apart a distance d1 from the bearing member 214b. FIGS. 4A-4B show the tailgate assembly of FIGS. 3A-3B after application of a cargo load to the garnish 212. When a cargo load $F_{applied}$ above the predetermined threshold value is applied to the garnish 212, the garnish deforms and the load distributor 224 moves toward the tailgate rear edge 206r, further deflecting the spring 220a. When the spring 220a reaches an additional deflection of d1, the load distributor 224 contacts the bearing member 214b. Thereafter, at least a portion of the applied cargo load is transferred to the bearing member 214b. Since the applied load $F_{applied}$ is above the predetermined threshold value, the actual load acting on the bearing member 214b (after overcoming the spring force) is sufficient to cause an actuatable portion of the ribbon switch 214r to move an additional distance d2 toward the tailgate rear edge 206r (as illustrated in (FIG. 4C) until the switch 214r is actuated by physical contact between switch contacts CC1 and CC2.

Figure 4C:
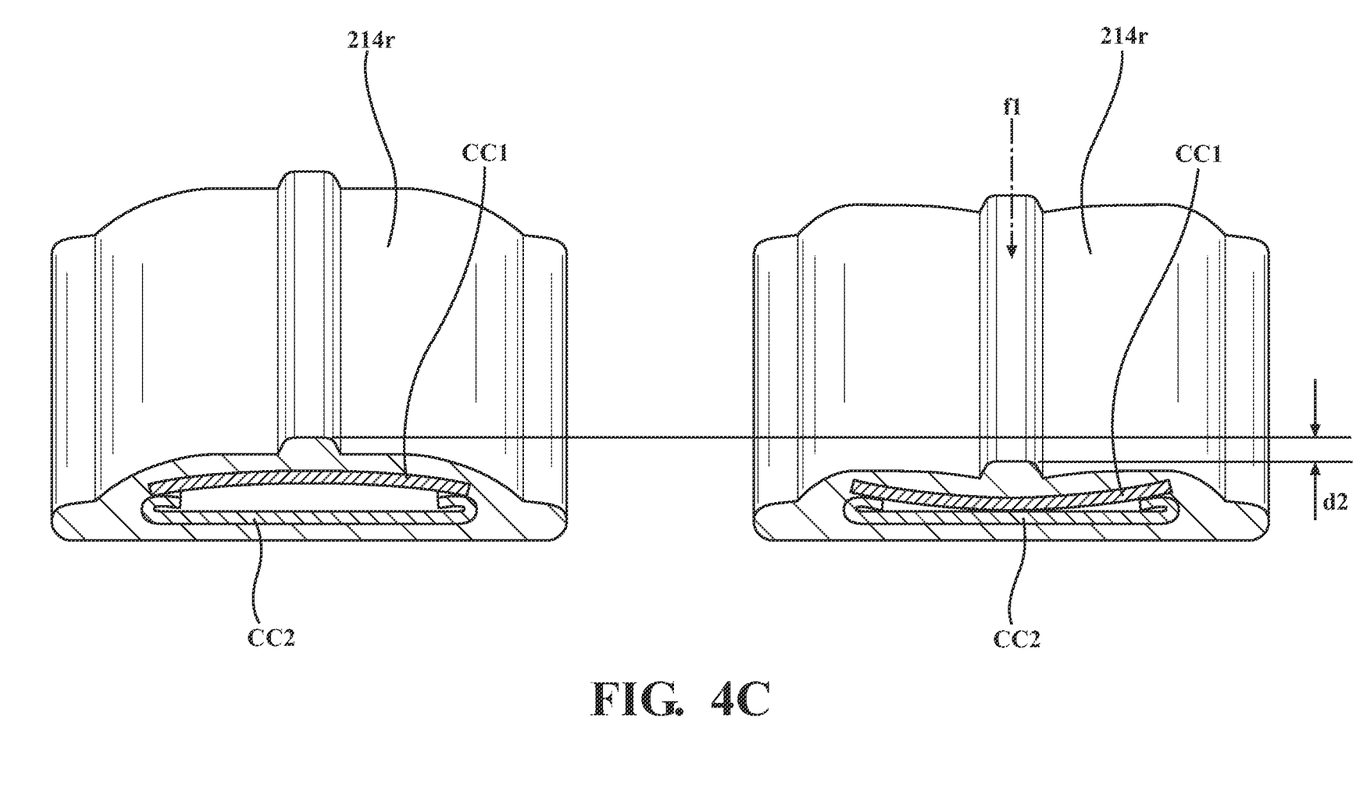
FIG. 4C is a schematic cross-sectional view of a portion of a ribbon switch as incorporated into the embodiment shown in FIGS. 3A-4B, showing the principle of operation of the switch responsive to application of a generalized load f1 sufficient to actuate the switch.

While the switch 214r remains actuated by application of the cargo load, the tailgate automatic opening/closing mechanism 145 will be prevented from opening the tailgate 206 responsive to an automatic opening command. However, the tailgate automatic opening/closing mechanism 145 may be structured to permit manual opening of the tailgate 206 even when the switch 214r is actuated.

Figure 5A:
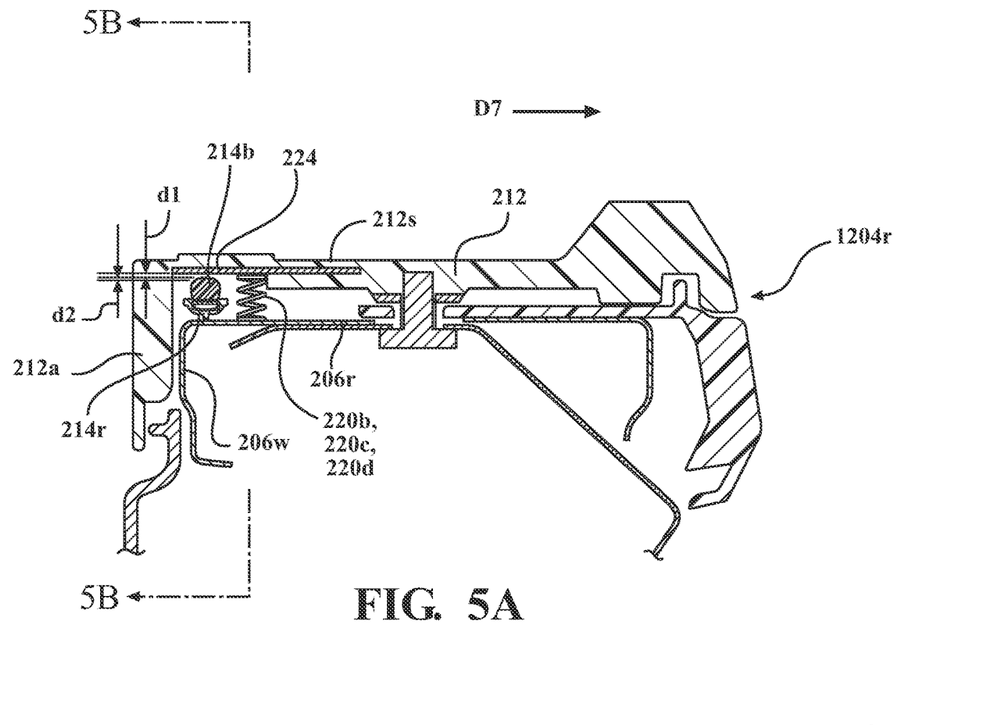
FIG. 5A is a cross-sectional side view of a portion of another embodiment of the tailgate assembly, shown prior to application of a cargo load to the tailgate assembly and prior to actuation of a ribbon switch of the embodiment.
Figure 5B:
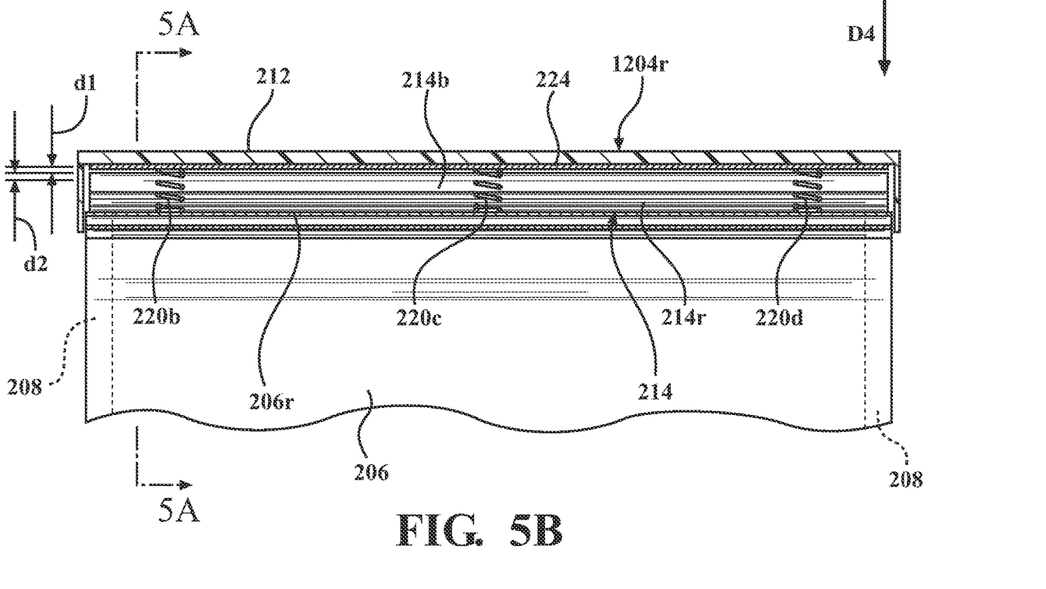
FIG. 5B is a cross-sectional end view of a portion of the tailgate assembly shown in FIG. 5A.

FIGS. 5A-6B illustrate an arrangement of the tailgate assembly utilizing three spaced-apart garnish restoring springs 220b, 220b, 220c acting on the load distributor 224 between the ends of the load distributor 224. The embodiment of FIGS. 5A-6B also uses a ribbon switch 214r to control operation of the tailgate automatic opening/closing mechanism 145. FIG. 5A is a cross-sectional side view of a portion of the tailgate assembly 1204. FIG. 5B is a cross-sectional end view of the tailgate assembly of FIG. 5A. FIGS. 5A-5B show the tailgate assembly 1204 with no cargo load applied and with the garnish 212 in the unloaded configuration. Prior to application of the load, the load distributor 224 may be spaced apart a distance d1 from the bearing member 214b.

Figure 6A:
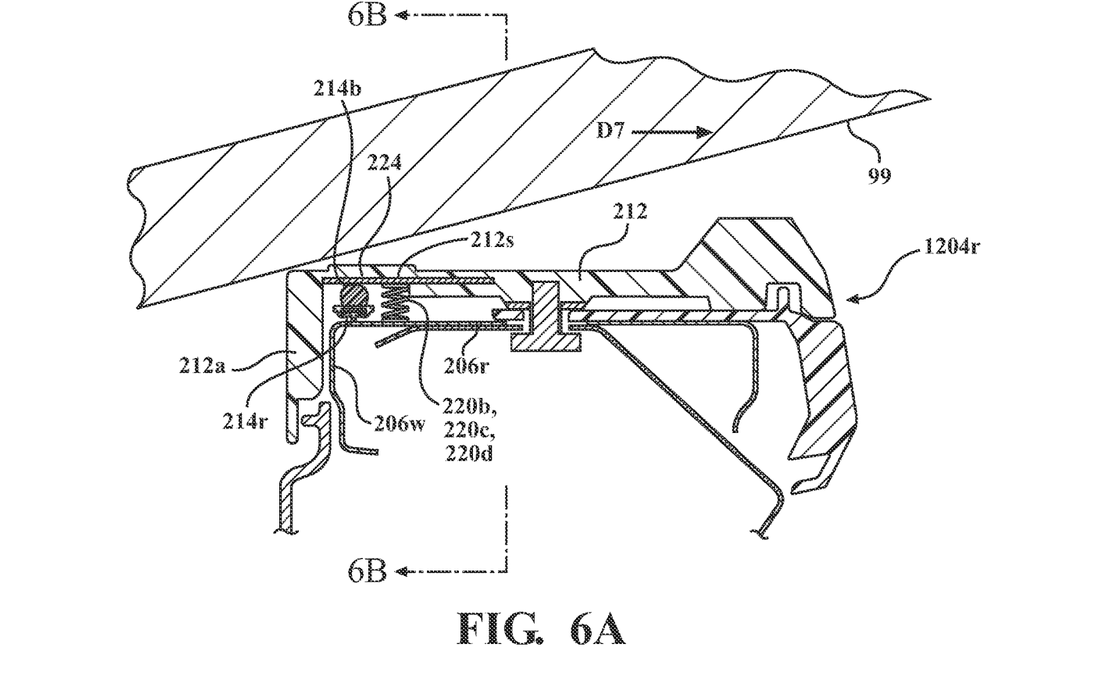
FIG. 6A is the cross-sectional side view of FIG. 5A showing actuation of the ribbon switch by application of a cargo load to the rear portion of the tailgate assembly.
Figure 6B:
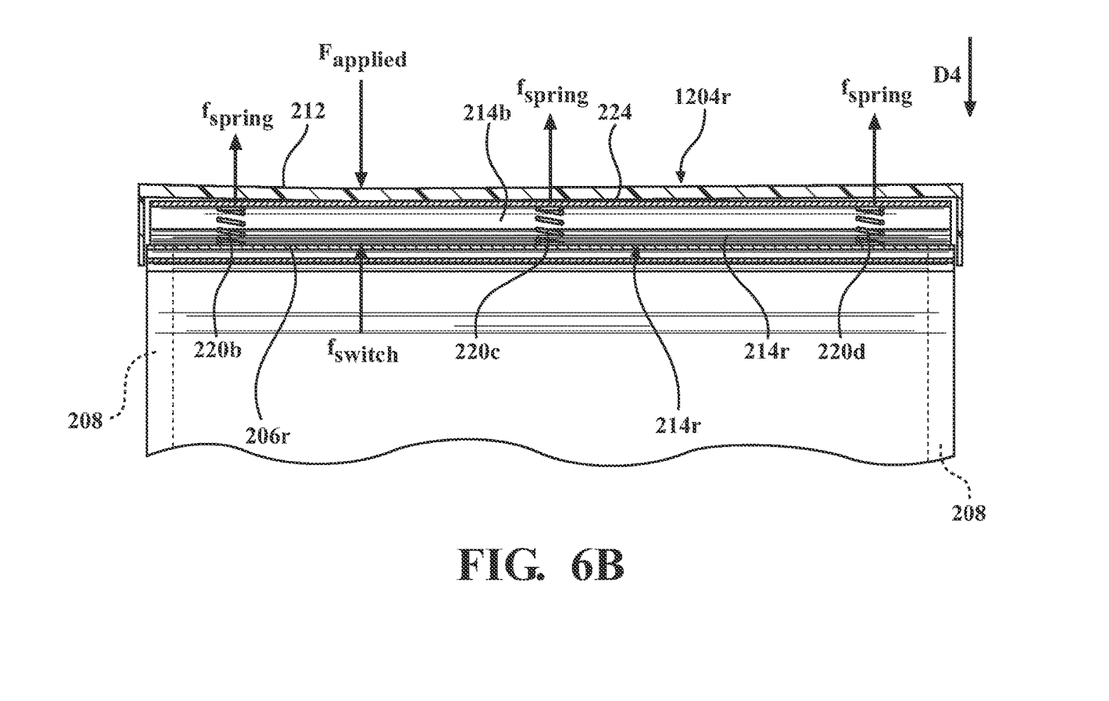
FIG. 6B is a cross-sectional end view of a portion of the tailgate assembly shown in FIG. 5A.

FIGS. 6A-6B show the tailgate assembly after application of a cargo load $F_{applied}$ to the garnish 212. Operation of the embodiment shown in FIGS. 5A-6B is substantially the same as for the embodiment shown in FIGS. 3A-4C. When a cargo load above the predetermined threshold value is applied to the garnish 212, the garnish deforms and the load distributor 224 moves toward the tailgate rear edge 206r, further deflecting the springs 220b, 220b, 220c. When the springs 220b, 220b, 220c reach an additional deflection of d1 (past the initial deflection $d_{INITIAL}$), the load distributor 224 contacts the bearing member 214b. Thereafter, at least a portion of the applied cargo load is transferred to the bearing member 214b. Since the applied load $F_{applied}$ is above the predetermined threshold value, the portion of the applied load acting on the bearing member 214b is sufficient to cause an actuatable portion of the ribbon switch 214r to move an additional distance d2 toward the tailgate rear edge (as illustrated in FIG. 6B) until the switch is actuated.

While the switch 214r remains actuated by application of the cargo load, the tailgate automatic opening/closing mechanism 145 will be prevented from opening the tailgate 206 responsive to an automatic opening command. The spring arrangement of FIGS. 5A-6B provides a more even distribution of garnish restoring force along the load distributor 224 than would be possible using a single spring.

FIGS. 7A-7B illustrate an arrangement 2204 of the tailgate assembly utilizing a pair of momentary or button switches 230a, 230b acting on the load distributor 224 at opposite ends of the load distributor, to control operation of the tailgate automatic opening/closing mechanism 145. The embodiment of FIGS. 7A-7B also uses an arrangement of three spaced-apart garnish restoring springs 220b, 220b, 220c acting on the load distributor between the ends of the load distributor 224. FIG. 7A is a cross-sectional side view of a portion of the tailgate assembly 2204 similar to the views shown in FIGS. 3A, 4A, 5A, and 6A. FIG. 7B is a cross-sectional end view of the tailgate assembly of FIG. 7A, similar to the views shown in FIGS. 3B, 4B, 5B, and 6B.

Prior to application of the cargo load $F_{applied}$, the load distributor 224 may be spaced apart a distance d1 from the button switches 230a, 230b. When a cargo load above the predetermined threshold value is applied to the garnish, the garnish 212 deforms and the load distributor moves toward the tailgate rear edge, further deflecting the springs 220b, 220b, 220c. When the springs reach an additional deflection of d1, the load distributor contacts one or more of the button switches 230a, 230b. Further movement of the load distributor 224 and deflection of the springs 220b, 220b, 220c a distance d2 may cause one or both of the button switches 230a, 230b to actuate.

If the cargo load is applied off-center along the load distributor as shown in FIG. 7B, the line of application of the load will be closer to one of the button switches (for example, switch 230a) than to the other button switch. Thus, depending on the load application point, the load distributor 224 may contact and actuate one button switch but not the other switch. Also, in the arrangement shown in FIG. 7B, a greater proportion of the applied load may act on switch 230a than on switch 230b.

For two button switches 230a, 230b operable at opposite ends of the load distributor as shown in FIG. 7B, the actuation force for each individual button switch may be determined using the following relationship:

$$f_{button}=(F_{applied}-(f_{spring}\times N))/2$$

where $f_{button}$ is the force required to actuate an individual button switch.

Using this relationship, in a case where the cargo load $F_{applied}$ is applied along a line equidistant from the centerlines of the switches, approximately half of the applied load should act on each switch (after overcoming the spring forces). Then, in the case where the load is applied equidistantly from each switch, both switches may actuate responsive to the load since the applied force should overcome the combined button switch actuation forces.

As the line of action of the applied force $F_{applied}$ approaches the centerline of either of the switches 230a, 230b, the proportion of the applied load acting on that switch will approach $F_{applied}$. Thus, if the applied load is off-center, a proportion of the applied load exceeding the switch actuation force will still be applied to at least one of the switches, thereby actuating the switch.

The switches 230a, 230b may be operably connected to the tailgate automatic opening/closing mechanism 145 in parallel, so that control of the mechanism 145 will be implemented if either one of the switches is actuated, even if the other switch is not actuated. While either of switches 230a, 230b remain actuated by application of the cargo load, the tailgate automatic opening/closing mechanism 145 may be prevented from opening the tailgate responsive to an automatic opening command. However, the tailgate automatic opening/closing mechanism 145 may be structured to permit manual opening of the tailgate 206 even when a button switch is actuated.

Any of the alerts described herein may be in any suitable form, such as audible, visual, tactile or a combination of these. Following generation of the at least a first alert, additional alerts may be generated if the first alert is not acknowledged. Successive alerts may increase in intensity and involve the transmission of messages via a wide variety of media, and to a wide variety of recipients. Any alerts generated may include a request for response or acknowledgement of receipt of the alert by the recipient.

Figure 8:
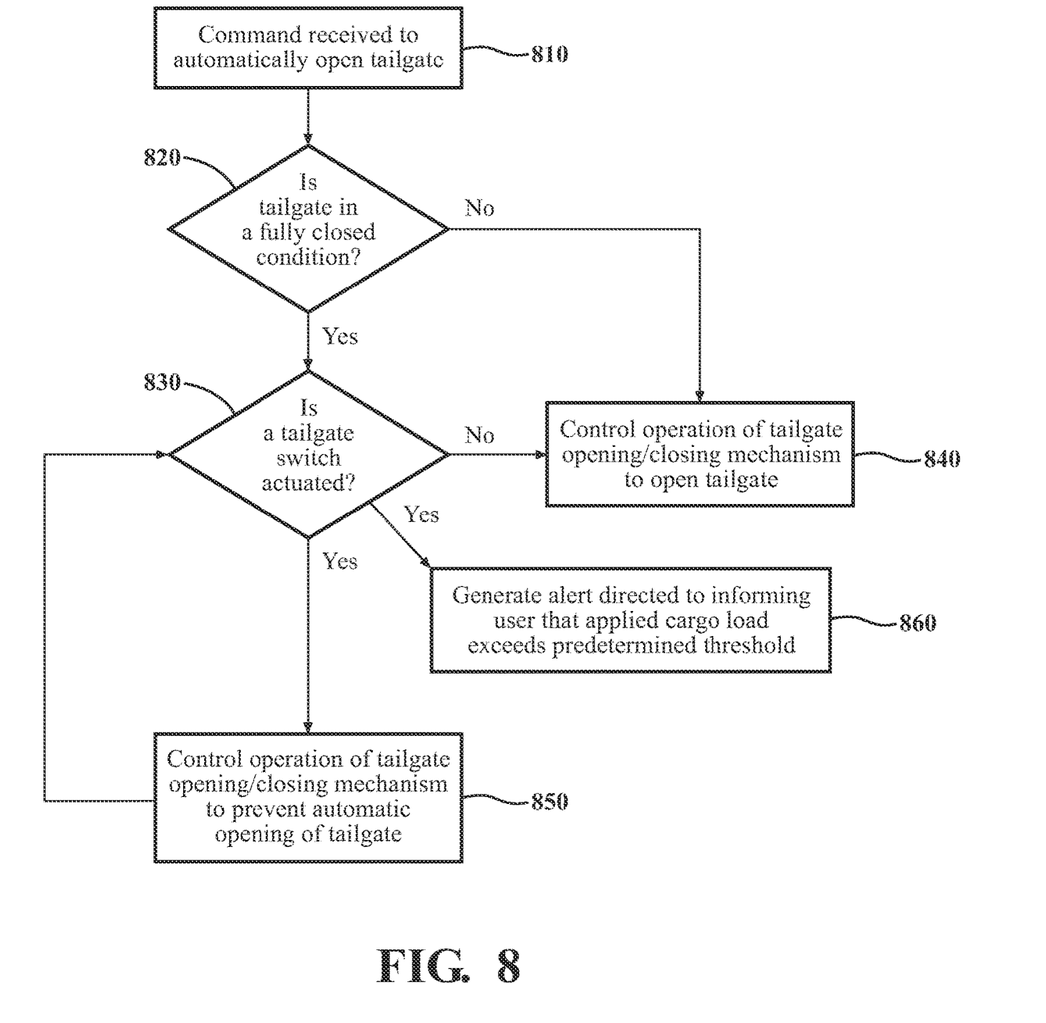
FIG. 8 is a flow diagram illustrating operation of a system for controlling automatic operation of a vehicle tailgate assembly responsive to application of a load to the tailgate, in accordance with embodiments described herein.

FIG. 8 is a flow diagram illustrating operation an embodiment of the vehicle tailgate assembly. In block 810, a command may be received to automatically open the tailgate. The command may be received by the tailgate control module 117 or by the tailgate automatic opening/closing mechanism. If the tailgate 206 is not in a fully closed condition (block 820) when the command to automatically open is received, it may be assumed that conditions necessary for actuation of the tailgate switch(es) 220 are not present, and the tailgate automatic opening/closing mechanism 145 may be controlled to open the tailgate 206. In an embodiment of the vehicle incorporating a tailgate control module 117, the module may monitor the tailgate sensor(s) 121 to determine whether or not the tailgate 206 is fully closed. Alternatively, the tailgate sensor(s) 121 may be operably connected to the tailgate automatic opening/closing mechanism 145 so that the tailgate 206 may be controlled to automatically open responsive to the "open" command if the tailgate is not in a fully closed condition. Also, if the tailgate 206 is in a fully closed condition and the tailgate switch(es) is not actuated (block 830), it may be assumed that the tailgate assembly is not loaded past the predetermined threshold value. Then, the tailgate automatic opening/closing mechanism 145 may be controlled to open the tailgate 206.

However, if the tailgate 206 is in a fully closed condition and the tailgate switch(es) 220 are actuated (block 830), operation of the tailgate automatic opening/closing mechanism 145 may be controlled (in block 850) in a manner described herein to prevent automatic opening of the tailgate. In addition, at the same time, an alert may be generated (in block 840) directed to informing a user that a load applied to the fully-closed tailgate assembly exceeds the predetermined threshold value, and that the command to automatically open the tailgate 206 will not be executed.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-10, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle tailgate assembly comprising:
 a tailgate having a rear edge;
 a load distributor movably mounted to the tailgate opposite the rear edge; and
 a switch assembly operably connected to the tailgate and including a switch structured to be actuatable responsive to movement of at least a portion of the load distributor a predetermined distance in a direction toward the rear edge, the switch assembly being operably connected to a tailgate automatic opening/closing mechanism such that actuation of the switch controls operation of the mechanism to prevent execution of a command to automatically open the tailgate when the tailgate is in a fully closed condition.

2. The tailgate assembly of claim 1 further comprising at least one spring positioned between the load distributor and the tailgate rear edge, the switch being structured to exert a force on the load distributor in a direction away from the rear edge.

3. The tailgate assembly of claim 1 wherein the load distributor is structured to be movable in a direction toward the tailgate rear edge, and wherein the switch is structured to be actuatable responsive to application of a load exceeding a predetermined threshold value to the load distributor.

4. The tailgate assembly of claim 3 further comprising a garnish covering the tailgate rear edge and the load distributor so as to enable application of the load to the load distributor through an exterior of the garnish, at least a portion of the garnish being in direct physical contact with the load distributor, and wherein the garnish is structured to be deformable to a loaded configuration responsive to application of the load.

5. The tailgate assembly of claim 4 further comprising a spring positioned between the load distributor and the rear edge and structured to exert a force on the load distributor sufficient to reconfigure the at least a portion of the garnish in contact with the load distributor from the loaded configuration to an unloaded configuration responsive to removal of the load.

6. The tailgate assembly of claim 5 further comprising a plurality of springs positioned between the load distributor and the rear edge the plurality of springs being structured to, in combination, exert a force on the load distributor sufficient to reconfigure the at least a portion of the garnish in contact with the load distributor from the loaded configuration to the unloaded configuration.

7. The tailgate assembly of claim 1 wherein actuation of the switch operates to prevent an electrical current from flowing to the tailgate automatic opening/closing mechanism responsive to a command to automatically open the tailgate.

8. The tailgate assembly of claim 1 wherein the switch assembly comprises a ribbon switch.

9. The tailgate assembly of claim 1 wherein the switch assembly comprises a momentary/button switch.

10. The tailgate assembly of claim 9 wherein the switch assembly further comprises a plurality of momentary switches.

11. A vehicle including a vehicle tailgate assembly in accordance with claim 1.

12. The tailgate assembly of claim 1, wherein the switch is positioned along a rear edge of the tailgate.

13. A method of controlling operation of a tailgate assembly of a vehicle, the tailgate assembly including a tailgate having a rear edge and a load distributor movably mounted to the tailgate opposite the rear edge, the method comprising a step of controlling operation of the vehicle so as to prevent execution of a command to automatically open the tailgate when the tailgate is in a fully closed condition, responsive to movement of at least a portion of the load distributor a predetermined distance in a direction toward the rear edge.

14. The method of claim 13 wherein the step of controlling operation of the vehicle so as to prevent execution of a command to automatically open the tailgate comprises the step of controlling operation of the vehicle to interrupt or prevent a flow of electric current to a tailgate automatic opening/closing mechanism when a tailgate switch is in an actuated condition responsive to application of a load exceeding a predetermined threshold to the load distributor.

15. A system for controlling operation of a tailgate assembly of a vehicle, the tailgate assembly including a tailgate having a rear edge, and a load distributor movably mounted to the tailgate opposite the rear edge, the system comprising:
a switch structured to be actuatable responsive to movement of at least a portion of the load distributor a predetermined distance in a direction toward the rear edge;
a processor; and
a memory communicably coupled to the processor and storing a tailgate control module including computer-readable instructions that when executed by the processor cause the processor to control operation of the vehicle to prevent execution of a command to automatically open a tailgate when the tailgate is in a fully closed condition and while the switch is in an actuated condition.

16. The system of claim 15 further comprising a tailgate automatic opening/closing mechanism configured to control automatic opening and closing of the tailgate and operably connected to the switch, and wherein the tailgate control module includes computer-readable instructions that when executed by the processor cause the processor to control operation of the vehicle to interrupt or prevent a flow of electric current to the tailgate automatic opening/closing mechanism while the switch is in the actuated condition.

* * * * *